(12) United States Patent
Ault et al.

(10) Patent No.: US 6,907,605 B1
(45) Date of Patent: Jun. 14, 2005

(54) METHOD AND APPARATUS FOR PROVIDING FOR NOTIFICATION OF TASK TERMINATION

(75) Inventors: Donald F. Ault, Hyde Park, NY (US); Ernest S. Bender, Saugerties, NY (US); John A. Helmbold, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 09/080,504

(22) Filed: May 18, 1998

(51) Int. Cl.$^7$ ................................................ G06F 9/46
(52) U.S. Cl. ...................................................... 718/100
(58) Field of Search ................................. 709/100, 102

(56) References Cited

U.S. PATENT DOCUMENTS

| | | | | |
|---|---|---|---|---|
| 4,980,824 A | * | 12/1990 | Tulpule et al. | |
| 5,249,291 A | * | 9/1993 | Williams | |
| 5,305,455 A | * | 4/1994 | Anschuetz et al. | 709/100 |
| 5,317,738 A | * | 5/1994 | Cochcroft, Jr. et al. | 709/103 |
| 5,390,329 A | | 2/1995 | Gaertner et al. | 395/650 |
| 5,452,459 A | * | 9/1995 | Drury et al. | 707/3 |
| 5,515,538 A | | 5/1996 | Kleiman | 395/733 |
| 5,542,046 A | * | 7/1996 | Carlson et al. | 713/200 |
| 5,544,316 A | * | 8/1996 | Carpenter et al. | 709/300 |
| 5,619,696 A | | 4/1997 | Nakagawa | 395/670 |
| 5,644,766 A | | 7/1997 | Coy et al. | 395/620 |
| 5,801,690 A | * | 9/1998 | Ayoub et al. | 345/329 |
| 5,960,178 A | * | 9/1999 | Cochinwala et al. | 370/412 |
| 5,991,820 A | * | 11/1999 | Dean | 709/300 |
| 6,125,401 A | * | 9/2000 | Huras et al. | 709/300 |

FOREIGN PATENT DOCUMENTS

| | | | |
|---|---|---|---|
| JP | 05127927 A | 5/1993 | |

OTHER PUBLICATIONS

IBM Technical Disclosure Bulletin, vol. 34, No. 10B–Mar. 1992 "Asynchronous Recovery And Reliability . . . System" pp. 234–236.
IBM Technical Disclosure Bulletin, vol. 35, No. 3, Aug. 1992 "Generalized Inter–Task Communication on MVS/ESA" pp. 1–3.
IBM Technical Disclosure Bulltein, vol. 37, No. 2A, Feb. 1994–"Dispatcher Queue To Provide Processor . . . Multi-processor" pp. 573–575.
IBM Technical Disclosure Bulltein, vol. 38, No. 2, Feb. 1995–"Preferential Affinity . . . Scheduling" pp. 645–646.
IBM BookManager Book Server–OS/390 Vir2.0 MVS–Sections 18.5.6, 18.5.6.1, 18.5.6.2, 18.5.6.3, 18.5.6.4, 18.5.6.5.
UNIX Network Programming–W. Richard Stevens, 1990, pp. 126 through 137, Chapter 3.

* cited by examiner

*Primary Examiner*—Thomas Lee
*Assistant Examiner*—G. L. Opie
(74) *Attorney, Agent, or Firm*—William A. Kinnaman, Jr.

(57) ABSTRACT

A method and apparatus for ensuring that a process interacting with a failing process is notified of the failure of that process. Each process has a unique process identifier (PID) associated with it. Each process optionally has an affinity list containing one or more entries, each of which contains the identifier of a process that is to be notified when the process fails. A process updates the affinity list of a target process (either itself or another process) by calling an affinity service of the operating system (OS) kernel, specifying the type of operation (add or delete), the identifier of the target process, the identifier of the process that is to notified, and the type of event that is to be generated for the process that is to be notified. When a process fails, a process termination service of the OS kernel examines the affinity list of the failing process and, for each entry in the list, generates an event of the specified type for the process specified as to be notified.

15 Claims, 5 Drawing Sheets

METHOD AND APPARATUS FOR PROVIDING FOR NOTIFICATION OF TASK TERMINATION

BACKGROUND OF THE INVENTION

1. Field of the Invention

This invention relates to a method and apparatus for providing for notification of task termination and, more particularly, to a method and apparatus for providing for notification of process termination in a client/server system.

2. Description of the Related Art

Client/server computing systems are well known in the art. In a client/server system, a client process (or simply "client") issues a request to a server process (or simply "server"), either on the same system or on a different system, to perform a specified service. Upon receiving the request, the server process performs the requested service and returns the result in a response to the client process.

When creating a client/server application on a single system, there is frequently a need for a client to communicate requests to a server and to wait for the server to respond. Similarly, there can be multiple server processes that need to communicate with multiple client processes. If a client is waiting for a response from a server and the server terminates, the client process may hang in a wait until a user or operator makes a request to terminate the client process. Similarly, a server may be waiting for a response from a client and have the client terminate. Both client and server can add timer calls into their logic to cause the wait to time out, but this can cause unnecessary path length and requires the client or server application to pick a suitable time period.

In UNIX®-based systems, there are several programming constructs that can be used to keep track of the connection between multiple processes. If an application uses a fork( ) or spawn( ) service to create a child process, then the two processes are tied together by the UNIX framework. That is, if the child process terminates, the parent process is sent a SIGCHLD signal. If the parent process terminates, the child process is sent a SIGHUP signal. However, since interacting server and client processes are usually not bound together by this parent-child relationship, this mechanism is of little use as a general notification mechanism in UNIX-based systems.

SUMMARY OF THE INVENTION

A solution to this problem is provided by the PID affinity service of the present invention, described below. The term PID stands for process ID. Both the server and client processes have unique PIDs. The PID affinity service is used to create an affinity or bond between the client and server process, such that when one of them terminates, a mechanism is provided to drive a signal to notify the other waiting process.

In accordance with the present invention, each process in the operating system optionally has a PID affinity list that identifies processes that wish to be notified (via signal) when the process terminates. The PID affinity service provides the mechanism for a client to add its PID to a server's PID affinity list or for the server to add its PID to the client's PID affinity list. It is up to an application to determine which processes use the PID affinity service.

As an example of the operation of the present invention, suppose that a client is about to make a request to a server using a message queue. Prior to placing the request on the server input queue (by issuing a msgsnd system call), the client calls the PID affinity service to add its PID to the PID affinity list of the server. The client then issues a msgsnd system call to place the request on the server input queue. The client then issues a msgrcv system call to wait for a response from the server. While in this message queue wait, the server may terminate. If this happens, the kernel will see the PID affinity list and send a signal to each process (represented by a PID) that is on the PID affinity list. The signal will wake up the client process from the msgrcv wait and allow it to fail the current request and return control to the calling process.

The above description of a client/server communication using message queues is simply one example of how processes may communicate. They could also use shared memory, semaphores or any other communication mechanism. This example also described the client and server as simple single-threaded processes. It is possible for a server to be multithreaded and handling many requests concurrently from multiple clients. If such a server were to terminate, it would cause the notification of all the clients in its PID affinity list.

DESCRIPTION OF THE PREFERRED EMBODIMENT

Figure 2:
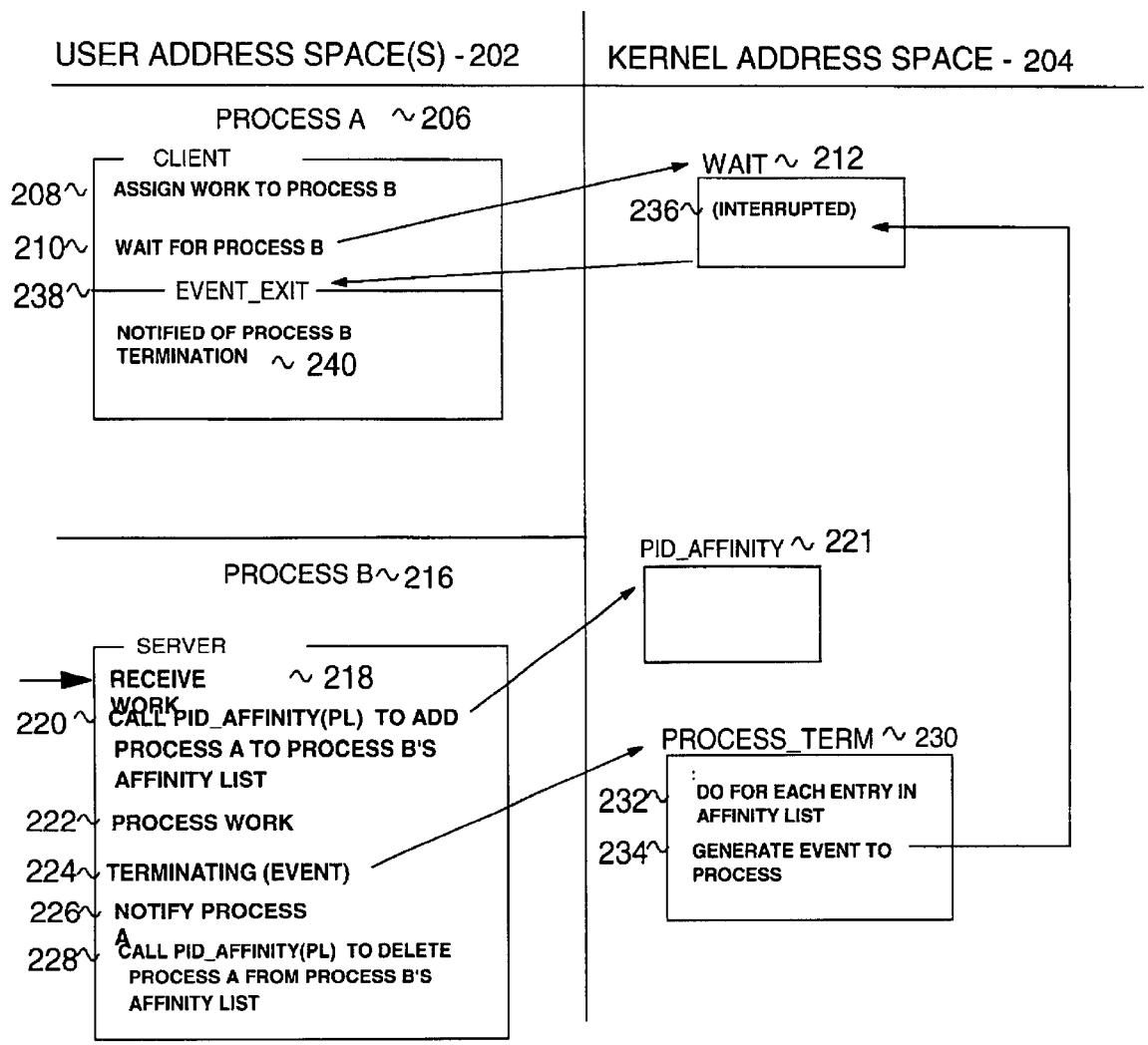
FIG. 2 shows the flow and logic for adding another process' PID to its own PID affinity list and the result of termination of the calling process.
Figure 3:
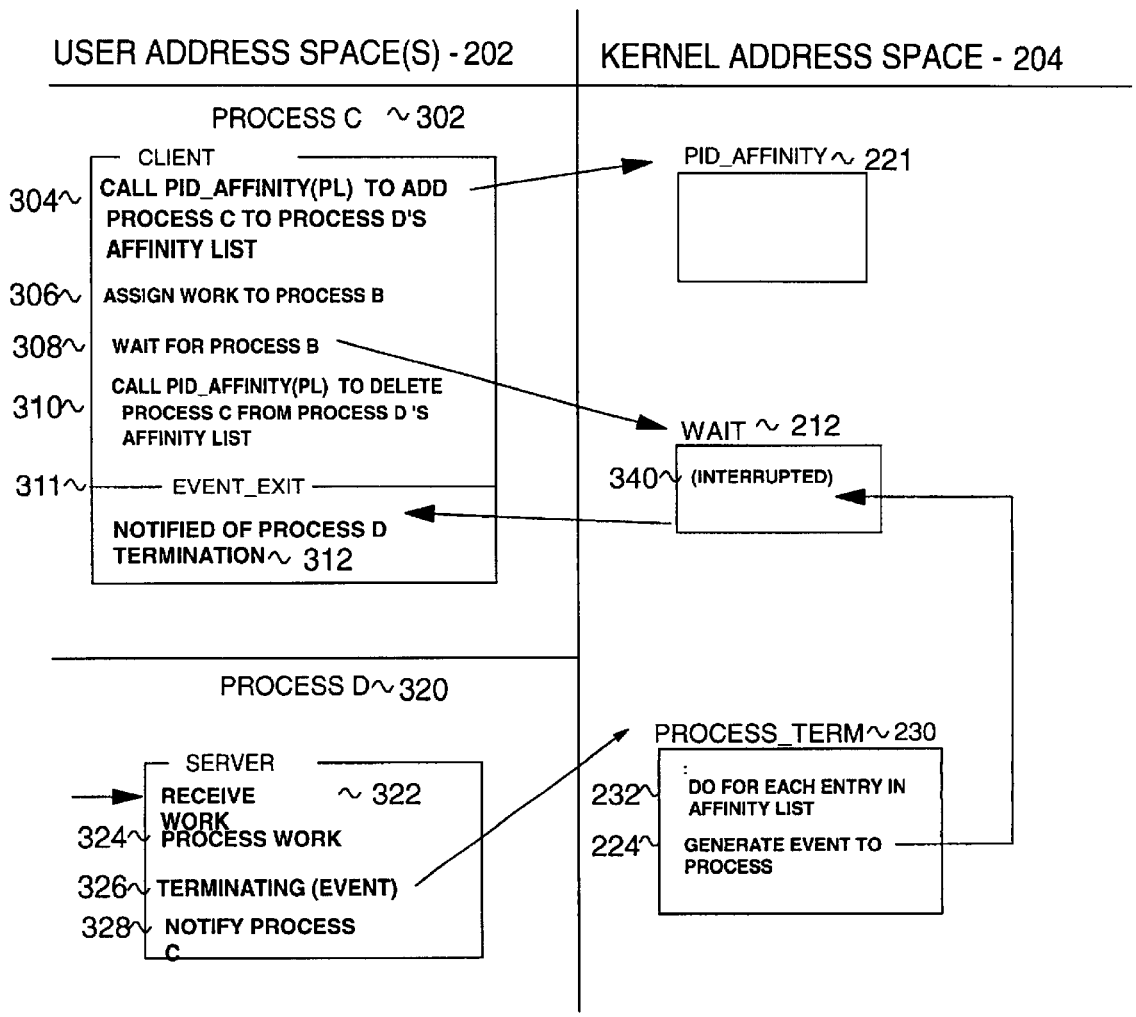
FIG. 3 shows the flow and logic for adding the caller's PID to the PID affinity list of a target process and the actions triggered by the termination of that target process.

Referring first to FIGS. 2–3, an embodiment of the present invention contains a PID affinity service 221 in the kernel address space 204 of a system also having one or more user address spaces 202 including processes 206 (process A) and 216 (process B). Kernel address space 204 is part of an operating system (OS) kernel (not separately shown) running, together with one or more user programs in user address spaces 202, on a general-purpose computer having a central processing unit (CPU), main and secondary storage, and various peripheral devices that are conventional in the art and therefore not shown. Although the present invention is not limited to any particular hardware or software platform, a preferred embodiment may be implemented as part of the IBM® OS/390® operating system, running on an IBM S/390® processor such as an S/390 Parallel Enterprise Server™ G4 or G5 processor.

Figure 1:
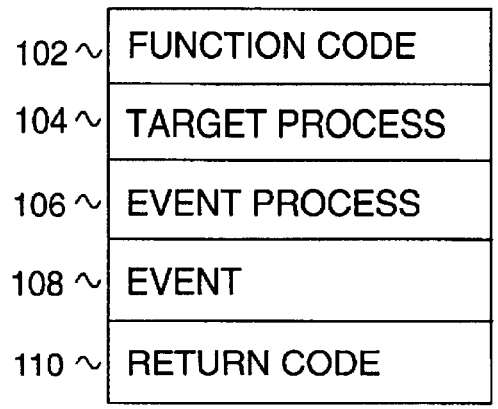
FIG. 1 shows the parameter list passed to the PID affinity service, a process information block and the PID affinity list.
Figure 1:
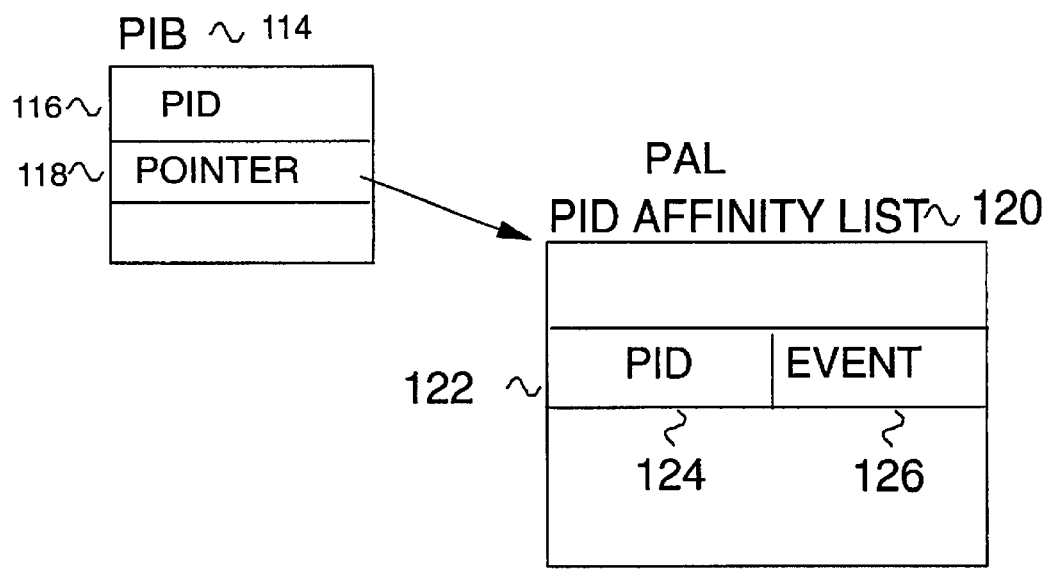

Referring now to FIG. 1, each process in the system has a process information block (PIB) 114 associated with it. Each PIB 114 contains a process ID (PID) 116 uniquely identifying the process and a pointer 118 to a PID affinity list (PAL) 120, as well as other items that are not related to the present invention and are therefore not shown. For each call to the PID affinity service 221 to add a PID to the list 120, an entry 122 is made in the list. Each entry 122 contains the PID 124 of the process to be notified of an event and an event type 126, which could be a signal number.

A PID affinity parameter list (PL) 100 contains the parameters specified by an application program as input to the PID affinity service 221, as well as output from the PID affinity service 221. These parameters include a function code 102, a target process parameter 104, an event process parameter 106, an event parameter 108 and a return code 110. Parameters 102–108 are input parameters supplied by the calling application to the PID affinity service 221, while return code 110 is an output parameter returned by the PID affinity service 221 to the calling application.

The function code 102 specifies which PID affinity service function is requested by the application program. Supported function codes 102 are adding an entry 122 to an affinity list 120 and deleting an entry 122 from an affinity list 120.

The target process parameter 104 specifies the target process (as identified by its PID) whose affinity list 120 is the target of the operation specified by the function code parameter 102.

The event process parameter 106 specified has different uses based upon the function code parameter 102 specified. The event process 106 identifies the process that is to be delivered the event when the target process terminates. When an application specifies a function code 102 to add an entry 122 to an affinity list 120, the contents of this parameter 106 are copied into an entry 124 in the affinity list 120 of the process specified by the target process parameter 104. When an application specifies the function code parameter 102 to delete an entry 122 from an affinity list 120, the contents of this parameter 106 are compared with existing entries 124 in the affinity list 120 of the process specified by the target process parameter 104. If an entry 122 with a matching process identifier 124 is found, it is cleared and is available to be reused.

The event parameter 108 specifies the event 126 to be generated when the target process 104 terminates. This parameter 108 is unused when the function code parameter 102 requests deletion of an entry 122. When the function code parameter 102 specifies adding an entry 122 to an affinity list 120, the contents of this parameter 108 are copied to an entry 126 in the affinity list 120 of the process specified by the target process parameter 104.

The fifth parameter 110 contains the return code generated by the PID affinity service. It is used to indicate the success or failure of the PID affinity service to the application program.

FIG. 2 shows the usage of the PID affinity service 221 when a client program adds its PID to the PID affinity list 120 of a server. FIG. 2 shows user address spaces 202 and a kernel address space 204. The kernel address space 204 is where services are provided that allow applications to communicate with other user address spaces 202. In this example, user address spaces 202 include a client address space 206 (process A) that is communicating with a server address space 216 (process B).

The client 206 initially assigns a work request to the server 216 (step 208). As discussed earlier, one means of doing this is by placing a message on a message queue. After assigning the work request at step 208, the client 206 waits for a response from the server 216 by invoking a wait function 212 in the kernel address space 204 (step 210). The wait function 212 could be a general-purpose wait function, or it could be a function like msgrcv that waits for a message or a signal. This is standard programming practice on UNIX systems. As described, for example, in W. R. Stevens, (*UNIX Network Programming,* 1990, pages 126–137, incorporated herein by reference, in a UNIX system a process wishing to send a message to another process may issue a msgsnd system call to place a message in a message queue. That other process may in turn issue a msgrcv system call to retrieve the message from the message queue.

In the server space 216, shown as process B, the server receives the work request from the client 206 (step 218). This could be accomplished using a function like msgrcv to receive a message placed on a message queue by the client 206 at step 208. After receiving the work request at step 218, the server 216 calls the PID affinity service (pid_affinity) 221 of the present invention with a function code 102 to add, a target process PID 104 of process B (itself), an event process 106 of process A, and an event 108 which could be a particular signal (step 220). Once this step is completed, should anything happen to terminate the server process 216, the client process 206 is guaranteed to be notified with the requested event 108.

Next, server 216 processes the work request assigned at step 208 (step 220). Assuming no errors occur, the server 216 processes the work request (step 222) and then notifies the client 206 of the completion (step 226). This could be accomplished by sending a message to the client 206 with the results of the work request. The msgsnd by the server 216 would wake up the client 206 in a msgrcv wait 212. After notifying client process 206 at step 226, the server 216 calls the PID affinity service 221 with function code 102 to delete an entry 122 in the PID affinity list 120 for a target process 104 set to process B 216 (itself) (step 228). The event process 106 is set to process A 206. After the PID affinity service 221 completes the request, the entry 122 for the client process 206 is removed from the PID affinity list 120 for the server process 216.

During this server processing, suppose a terminating event 224 occurs, which prevents the server from completing the work request at step 226. In this case, the kernel 204 gets control in process termination 230. As part of process termination 230, the kernel handles any entries 122 in the PID affinity list 120 for the terminating process 216. If an entry in the PID affinity list 120 is filled in (step 232), then the kernel generates the event 126 and targets this event to the PID 124 in the entry 122 of the PID affinity list 120 (step 234).

The generation of the event at step 234 causes the target process 206 to be resumed from its wait condition 212 (step 236) and triggers the delivery of the abnormal event 126 to an event exit 238 of process A 206. The client code in the event exit 238 is notified of the termination of the server 216 (process B) from which it was awaiting a response (step 240). The client event exit 238 can then decide whether to terminate or retry the request. What the client does when notified is not part of the present invention and is therefore not described.

FIG. 3 shows another model supported by the PID affinity service 221. In this case, a client process 302 (process C) determines the PID of a server process 320 (process D) with which it will soon communicate. This may be accomplished with shared memory, configuration files or other means not related to the present invention. The client process 302 then calls the PID affinity service 221 with a function code 102 of add, a target process 104 PID for process D 320 (the server), an event process 106 set to process C 302 (the client, itself) and the event 108 it wishes to receive if the server 320 terminates while processing its request (step 304).

The client 302 then assigns work to the server process 320 via a message queue or other communication mechanism (step 306). The client 302 then calls the wait service 212 to wait for a response from the server 320 (step 308). The wait service 212 puts the client 302 to sleep until the requested function completes or an abnormal event is received.

In the meantime, the server 320 has received the work request (step 322) and is processing the work (step 324). If all works successfully, the server 320 notifies the client 302 when the work completes (step 328). This notification at step 328 causes the client process 302 to exit the wait function 212 with a successful return code. Upon receiving control back from wait, the client 302 calls the PID affinity service 221 to undo the call made at step 304 (step 310). This call at step 310 will set the function code 102 to request delete, the target process 104 will identify server process D 320 and the event process 106 will identify this client 302.

If a terminating event 326 hits the server 320, then it will trigger the process termination service (process_term) 230. Process termination service 230 will run through the PID affinity list 120 for server process D 320 and for each entry in the PID affinity list (step 232), it will generate 224 the requested event 126 to the target PID 124 (step 234). In this case, the target PID 124 identifies client process C 302 and the event 126 is what was passed in the event parameter 108 in step 304.

When the event is generated at step 234, it causes client process C 302 to be taken out of the wait 212 with an interrupt (step 340). The wait function 212, instead of returning to the caller after step 308, now passes control to the event exit 311. The event exit 311 is notified of the termination of server process D (step 312). At this point, the client code 302 can either terminate, retry the request or request a different service.

Figure 4:
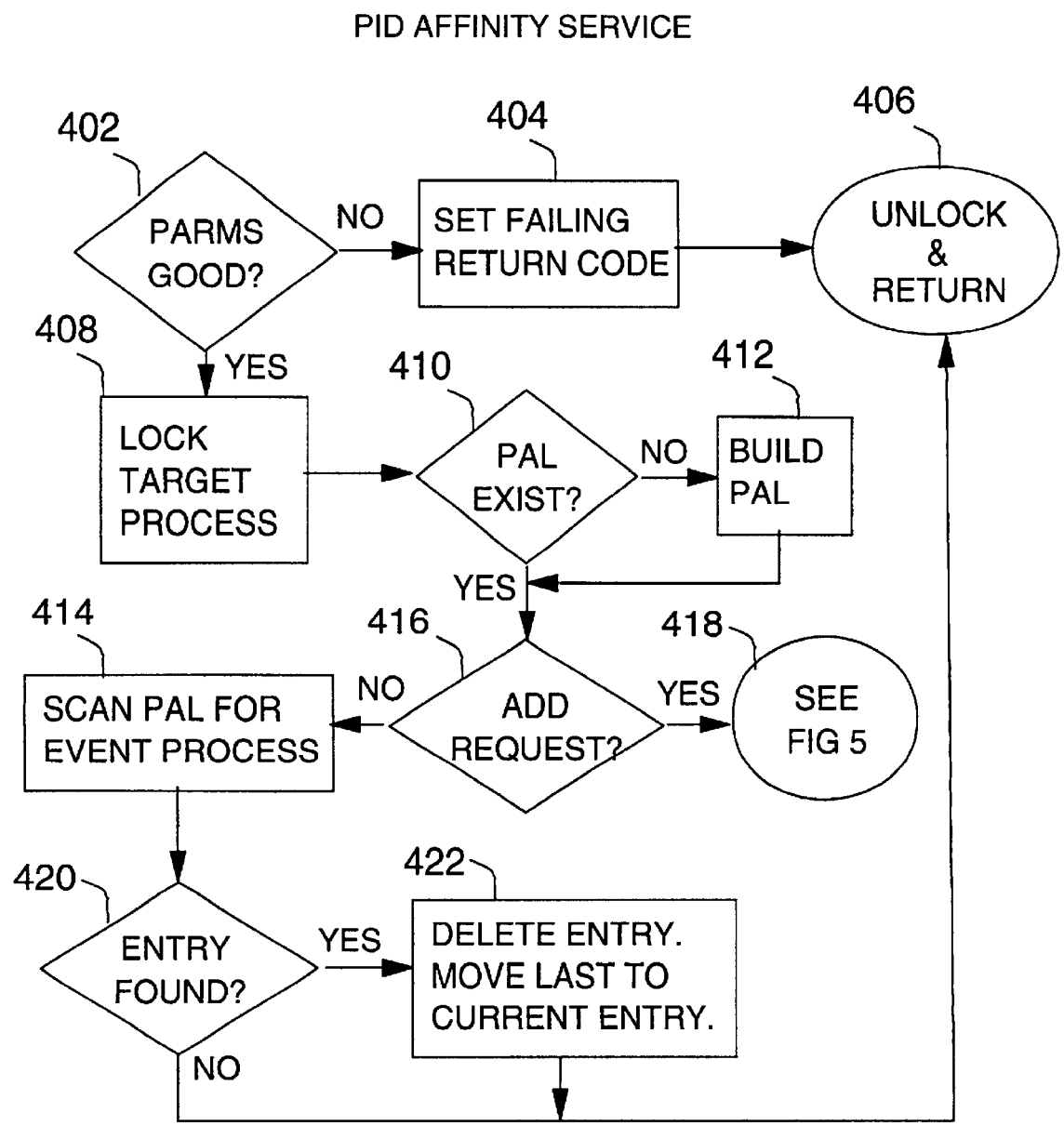
FIG. 4 shows the entry to the PID affinity service as well as the delete entry processing.

FIG. 4 shows the processing of the PID affinity service 221. On entry, the service 221 validates the caller's parameters (step 402). If the function code 102, target process PID 104, event process PID 106, or event 108 is invalid, then the service 221 sets a unique failing return code (step 404) and returns to the caller (step 406). Assuming all parameters are valid, the service 221 obtains a process lock for the target process 104 (step 408). This lock serializes updates to the PID affinity list 120 (here after referred to as PAL) of the target process 104 for multiple callers.

If the target process 104 does not yet have a PAL 120 (step 410), then storage is obtained for the PAL 120 and the location of the PAL 120 is stored in the Process Information Block (PIB) 114 in field 116 (step 412). Next the function code 102 is tested to determine whether add or delete processing is requested (step 416). If add processing is requested, processing is as described in FIG. 5 (step 418).

For delete processing, the PAL 120 is scanned for an entry 122 that has a PID 124 that matches the event process PID 106 passed as input (step 414). If a matching entry 122 is found (step 420), then the entry 122 is cleared and the last entry 122 in the PAL 120 is moved to the cleared entry to keep the table packed (step 422). The process lock is then released and control is returned to the caller (step 406). If the entry 122 is not found, then the process lock is released and control is returned to the caller without performing the deletion step 422 (step 406).

Figure 5:
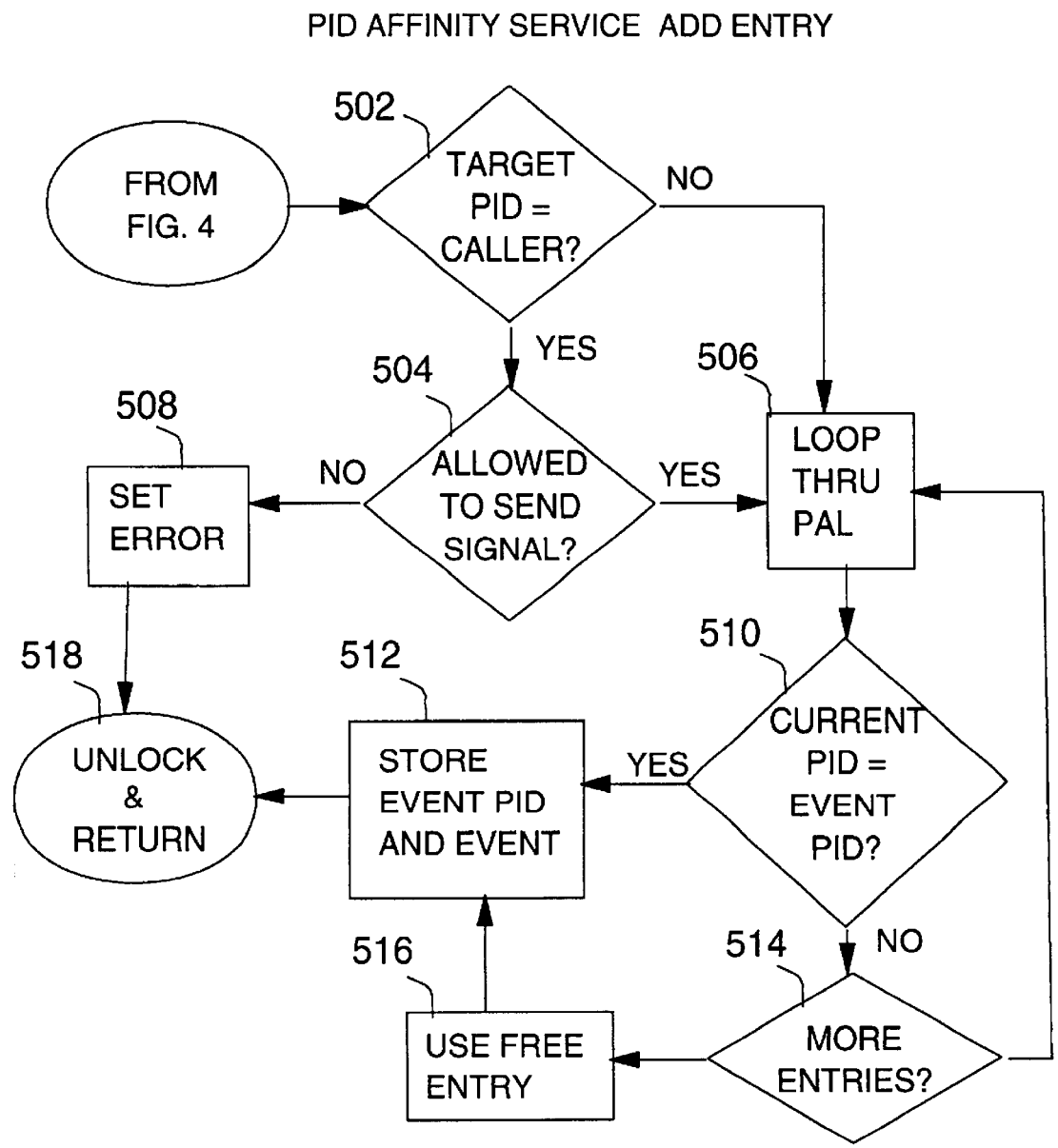
FIG. 5 shows the add entry logic of the PID affinity service.

FIG. 5 shows the processing to add an entry to the PAL 120. The target process PID 104 is tested (step 502) to determine if it is the same as the caller's PID 116. If they match, it means that if the calling process terminates, it will cause a signal (event 108) to be sent to the event process 106. Before adding the entry 122 to the PAL 120, a test is made to determine if the calling process is allowed to send a signal (event 108) to the event process 106 (step 504). If the caller is not permitted to send the signal (event 108), then the service sets an error code (step 508), releases the process lock and returns to the caller (step 518).

Once past the initial tests, the code loops through the PAL 120 (step 506). Looking at an entry 122 in the PAL 120, if the current PID 124 is the same as the event PID 108 (step 510), then this entry 122 is overlaid by storing the event PID 106 over the PID in the entry 124 and the event 108 over the event 126 in the entry 122 (step 512). If the PIDs don't match at step 510, then if there are more entries in the PAL 120 (step 514), the loop continues at step 506.

If the event PID 106 is not found in the PAL, then a new entry 122 is chosen. This will normally just use the next unused entry 122 in the PAL 120. If the PAL 120 is full, a new larger PAL is obtained, the old PAL 120 is copied into the new PAL and the address of the new PAL is stored in the PIB 114 in field 116. Since the process is locked (step 408), this can be done safely. After copying the old PAL to the new PAL, the old PAL is freed. The new entry is then stored as in step 512 using an unused entry 122 in the PAL. The process lock is released and control is returned to the caller (step 518).

Although a particular embodiment of the invention has been shown and described, various modifications and extensions within the scope of the appended claims will be apparent to those skilled in the art.

What is claimed is:

1. In an information handling system having a plurality of interacting tasks, a method of providing for notification of abnormal task termination, comprising the steps of:

defining for each of one or more target tasks an affinity list containing one or more entries for other tasks that interact with the target task and are to be notified on abnormal termination of the target task;

in response to receiving an affinity request specifying a target task and another task, adding an entry for the other task to an affinity list defined for the target task; and in response to detecting abnormal termination of a target task, notifying each other task contained in the affinity list defined for the target task.

2. The method of claim 1 in which the affinity request originates from the target task.

3. The method of claim 1 in which the affinity request originates from the other task.

4. The method of claim 1 in which the affinity request is of a first type, the method comprising the further step of:

in response to receiving an affinity request of a second type specifying a target task and another task, deleting an entry for the other task from the affinity list defined for the target task.

5. The method of claim 1 in which the adding step comprises the steps of:

determining whether an affinity list is already defined for the target task;

if an affinity list is already defined for the target task, adding an entry for the other task to the affinity list defined for the target task; and if an affinity list is not already defined for the target task, defining an affinity list for the target task and adding an entry for the other task to the affinity list defined for the target task.

6. The method of claim 1 in which the tasks are processes having separate address spaces.

7. The method of claim 1 in which the tasks are user tasks and the steps are performed by an operating system kernel.

8. The method of claim 1 in which the affinity request specifies a type of operation to be performed on the affinity list defined for the target process.

9. The method of claim 1 in which the affinity request specifies an event to be generated for the other task upon abnormal termination of the target task.

10. In an information handling system having a plurality of interacting tasks, apparatus for providing for the notification of abnormal task termination, comprising:

means for defining for each of one or more target tasks an affinity list containing one or more entries for other tasks that interact with the target task and are to be notified on abnormal termination of the target task;

means responsive to receiving an affinity request specifying a target task and another task for adding an entry for the other task to an affinity list defined for the target task; and means responsive to detecting abnormal termination of a target task for notifying each other task contained in the affinity list defined for the target task.

11. The apparatus of claim 10 in which the affinity request is of a first type, the apparatus further comprising:

means responsive to receiving an affinity request of a second type specifying a target task and another task for deleting an entry for the other task from the affinity list defined for the target task.

12. The apparatus of claim 1 in which the adding means comprises:

means for determining whether an affinity list is already defined for the target task;

means for adding an entry for the other task to the affinity list defined for the target task if an affinity list is already defined for the target task; and means for defining an affinity list for the target task and adding an entry for the other task to the affinity list defined for the target task if an affinity list is not already defined for the target task.

13. A program storage device readable by a machine, tangibly embodying a program of instructions executable by the machine to perform method steps for providing for notification of abnormal task termination, the method steps comprising:

defining for each of one or more target tasks an affinity list containing one or more entries for other tasks that interact with the target task and are to be notified on abnormal termination of the target task;

in response to receiving an affinity request specifying a target task and another task, adding an entry for the other task to an affinity list defined for the target task; and in response to detecting abnormal termination of a target task, notifying each other task contained in the affinity list defined for the target task.

14. The program storage device of claim 13 in which the affinity request is of a first type, the method steps further comprising:

in response to receiving an affinity request of a second type specifying a target task and another task, deleting an entry for the other task from the affinity list defined for the target task.

15. The program storage device of claim 13 in which the adding step comprises:

determining whether an affinity list is already defined for the target task;

adding an entry for the other task to the affinity list defined for the target task if an affinity list is already defined for the target task; and defining an affinity list for the target task and adding an entry for the other task to the affinity list defined for the target task if an affinity list is not already defined for the target task.

\* \* \* \* \*